March 18, 1952  J. E. TOMPKINS  2,589,309
CIRCULAR SAW SAFETY GUARD
Filed Aug. 27, 1946  4 Sheets-Sheet 1

INVENTOR
J. Everette Tompkins
BY Harry P. Canfield
ATTORNEY

March 18, 1952  J. E. TOMPKINS  2,589,309
CIRCULAR SAW SAFETY GUARD
Filed Aug. 27, 1946  4 Sheets-Sheet 2

INVENTOR.
J. Everette Tompkins
BY Harry P. Canfield
ATTORNEY

March 18, 1952 J. E. TOMPKINS 2,589,309
CIRCULAR SAW SAFETY GUARD

Filed Aug. 27, 1946 4 Sheets-Sheet 3

INVENTOR.
J. Everette Tompkins
BY Harry R. Canfield
ATTORNEY

March 18, 1952 J. E. TOMPKINS 2,589,309
CIRCULAR SAW SAFETY GUARD

Filed Aug. 27, 1946 4 Sheets-Sheet 4

INVENTOR.
J. Everette Tompkins
BY Harry P. Canfield

ATTORNEY

Patented Mar. 18, 1952

2,589,309

UNITED STATES PATENT OFFICE 2,589,309

CIRCULAR SAW SAFETY GUARD

John Everette Tompkins, Cleveland, Ohio, assignor, by mesne assignments, of 30/100 to Ralph R. Roemer, 35/100 to Louise E. Roemer, 25/100 to William R. Kiefer, and 10/100 to J. Everette Tompkins, all of Cleveland, Ohio Application August 27, 1946, Serial No. 693,351

3 Claims. (Cl. 143—159)

This invention relates to safety guards for rotary or circular saws.

The invention is particularly applicable to guard the circular saw of a sawing machine of the type in which the saw is above a work table and cuts work supported on the table.

The user of such a saw has a hand on the work being sawed, either to hold it by one hand against a fence while drawing the saw through the work with the other hand, or, to guide the work by hand along a fence to propel it through the saw. His hands will in either case be close to the saw, and an unguarded saw is therefore dangerous and the cause of accidents.

It has been proposed to guard the saw by a cover or guard enclosing the upper part of the saw; but the lower part of the saw has been left largely unguarded because of the fact that it is the lower part of the saw that cuts through the work, and therefore cannot be guarded or covered in any obvious manner, without interfering with its use. A guard or cover for the upper part of the saw leaves unguarded as much of the lower part as is required to cut the maximum thickness of material.

The above mentioned cover guard for the upper part has been made so that it can be rocked around the axis of the saw, for example, forwardly toward the user into proximity with the upper surface of the work, and this increases the protection which it affords, but the user is often careless and will not take the trouble to adjust the cover in this manner for different thickness of work.

When a user has an accident because of contact of his hand or a finger with the saw teeth, it is usually not because of placing his hand directly in front of the saw (in its plane of rotation). Usually his hand is at one side of the plane of the teeth, but, due to carelessness, not far enough away laterally from the teeth; or the accident results from carelessly moving his hand laterally toward the saw teeth, in picking up a sawed off piece, or, to give him a firmer grip on the work.

The primary object of the present invention is to provide a safety guard for the teeth of a circular saw at the lower cutting section of its periphery; and which will not interfere with the cutting operation of the saw.

Another object is to provide a circular saw safety guard for the lower part of the toothed periphery that cuts the work, and which automatically moves out of the way of the work as the saw cuts through it, without interruption of its guarding function.

Another object is to provide a guard for the toothed periphery of a circular saw at its lower part where it cuts through the work, and which accommodates itself automatically to different thicknesses of work being cut so as to always guard the variably exposed teeth that are out of the work.

Another object is to provide a guard for a circular saw comprising a hood or cover for the upper part of the saw; and a guard construction supported by the hood and guarding the teeth of the lower part of the saw that cut the work, and which automatically moves to accommodate itself to guard the variable peripheral extent of the teeth that are out of the work, resulting from the difference in thickness of different pieces of work being cut.

Other objects will be apparent to those skilled in the art to which the invention appertains.

The invention is fully disclosed in the following description taken in connection with the accompanying drawing, in which.

Figure 1:
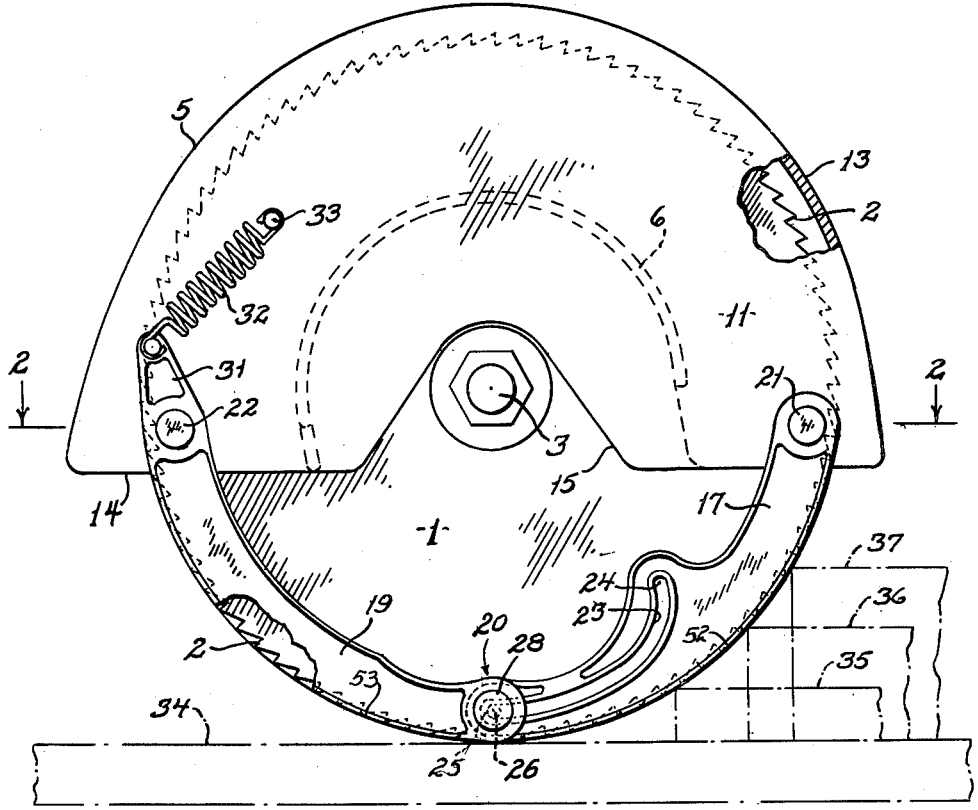
Fig. 1 is a side elevational view of a circular saw and means to guard the saw embodying my invention associated therewith.
Figure 3:
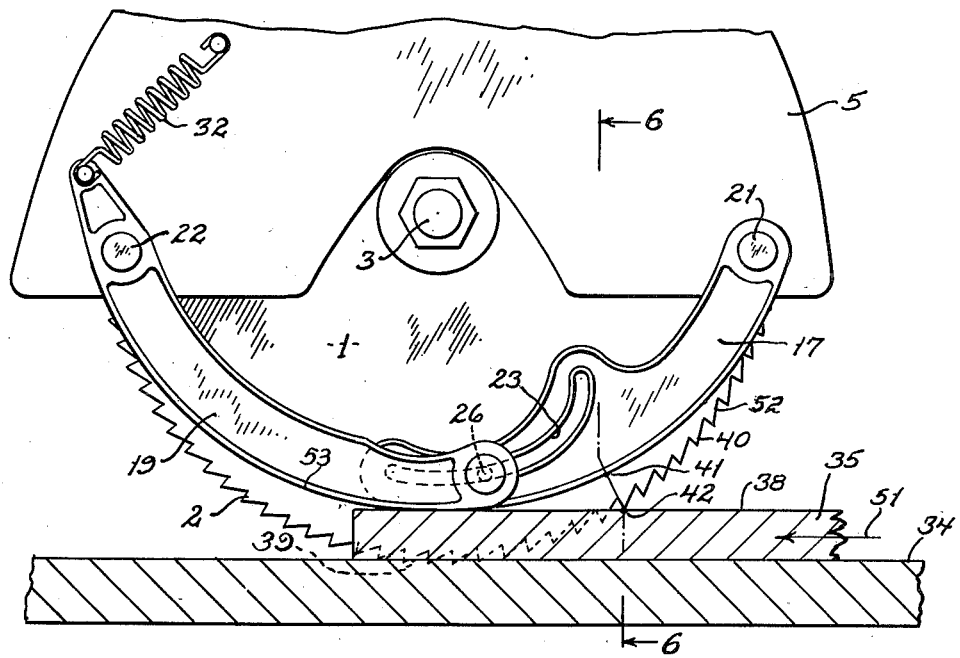
Figure 4:
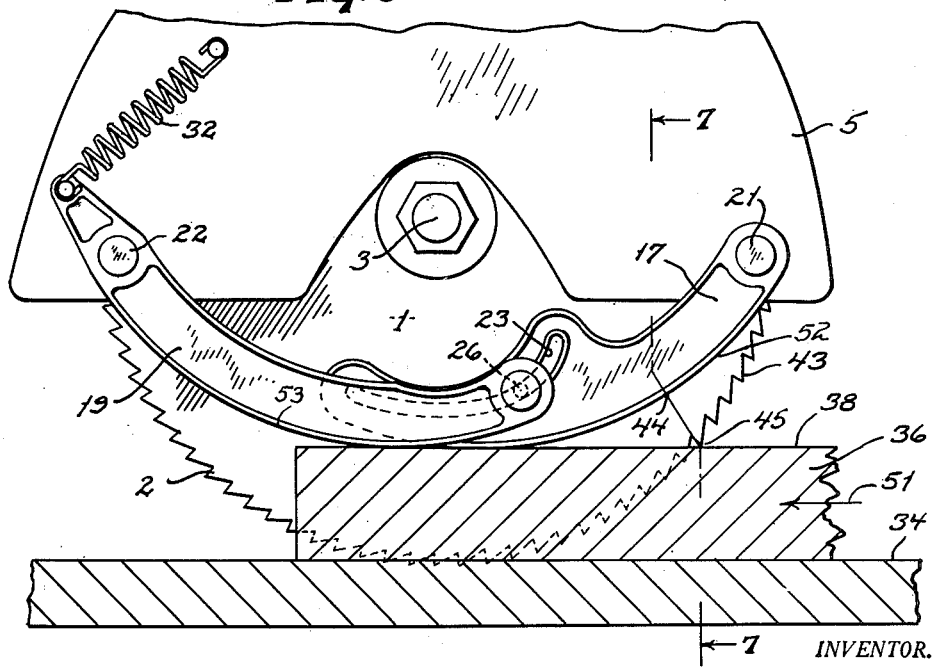
Figure 5:
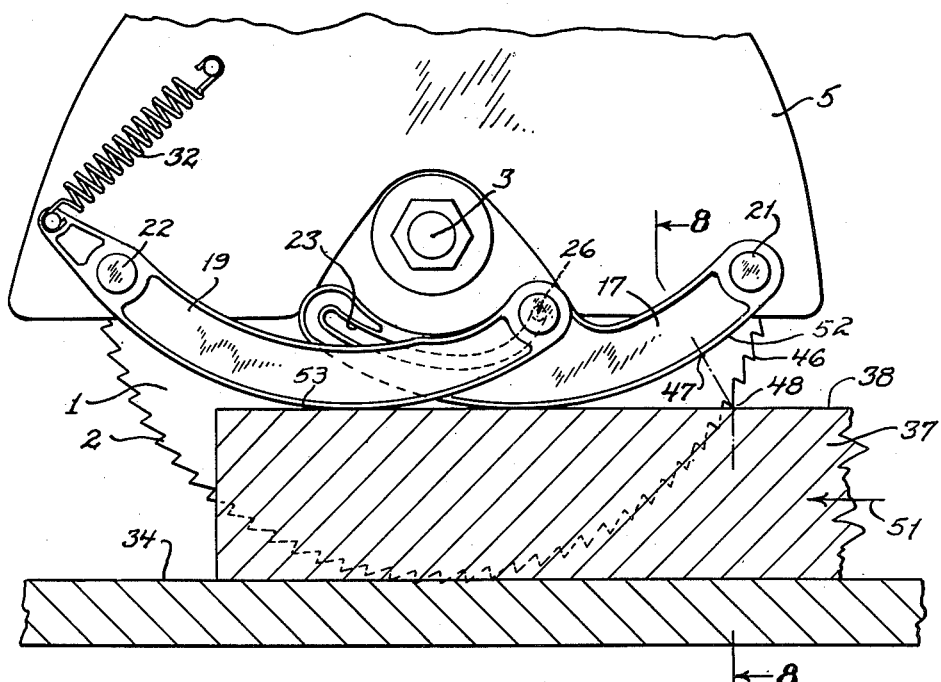
Figures 6, 7, 8:
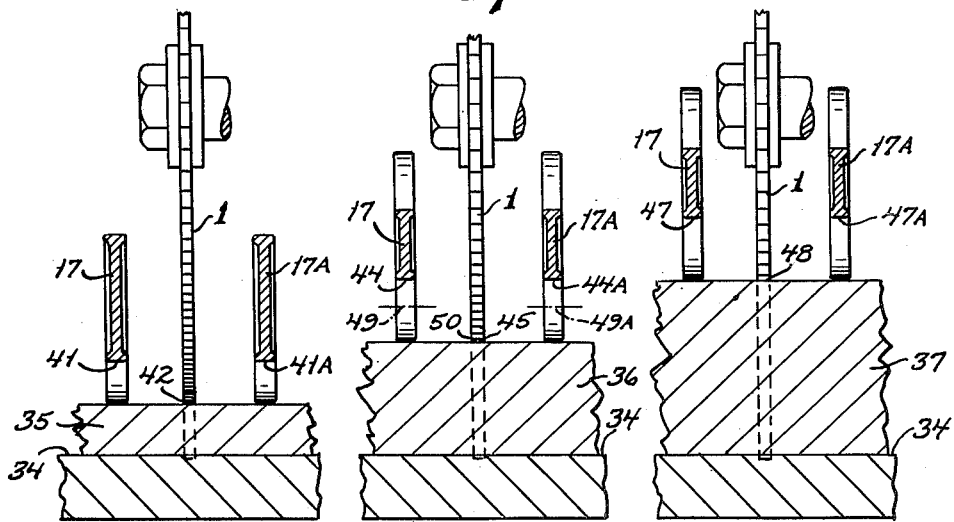
Figure 9:
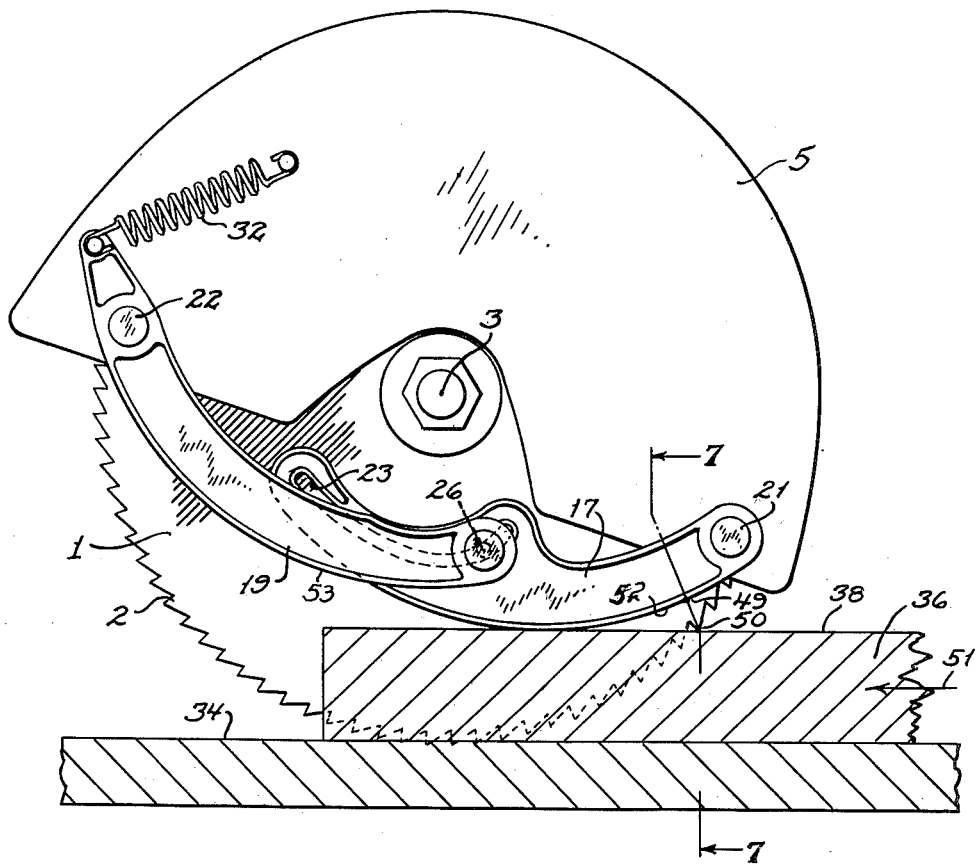

Figs. 3, 4, and 5 are views similar to a part of Fig. 1 with parts thereof in different operative positions which they assume in the operation of the saw to cut different thicknesses of work;

Figs. 6, 7, and 8 are fragmentary sectional views respectively from the planes 6—6, 7—7, and 8—8 of Figs. 3, 4, and 5 respectively illustrating certain spaced relations of parts thereof;

Fig. 9 is a view similar to Fig. 4 with the parts in a different adjusted position.

Figure 2:
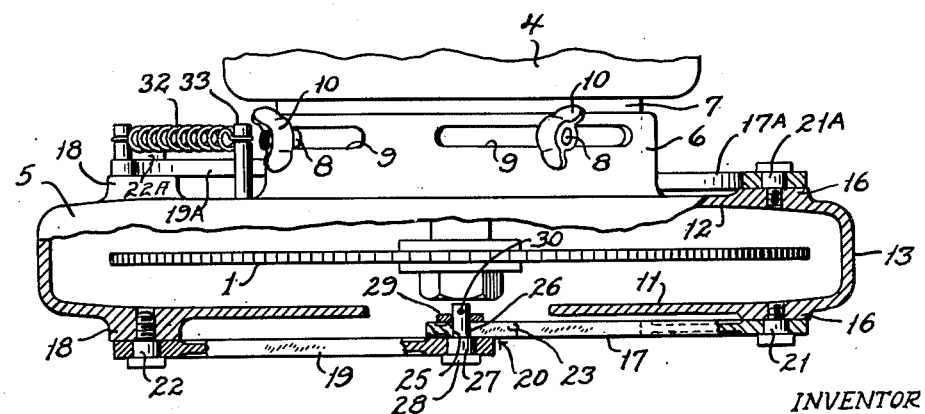
Fig. 2 is a sectional view taken from the plane 2—2 of Fig. 1, a part of the view above the section plane being in broken away plan, and parts below the section plane being broken away and in section.

Referring to the drawing Figs. 1 and 2, I have shown at 1 a circular saw having teeth 2 on its periphery, mounted in the usual manner on the shaft 3 of a driving motor 4.

The upper part of the saw 1 is covered and guarded by a hood guard 5, supported by the motor 4, and, to this end, the hood has an arcuate flange 6 projecting rearwardly therefrom, preferably cylindrical and coaxial with the shaft 3, and resting upon the upper surface of a cylindrical part 7, of the motor 4, and secured to the latter by studs 8—8 projecting radially outwardly from the cylindrical part 7 of the motor, and through slots 9—9 in the flange, and by wing nuts 10—10 on the studs; the slots 9—9 permitting the hood to be rocked around the axis of the shaft 3 and secured by the wing nuts in any rocked position.

The hood 5 is downwardly open and has side walls 11 and 12 spaced axially from the saw 1, and connected by an outer wall 13 spaced radially from the saw teeth 2. The side wall 11 terminates in an edge 14 which in the normal position of the hood is preferably horizontal and has a notch 15 therein with which the motor shaft 3 is aligned. The side wall 12 as will be apparent is similar to the side wall 11 but opens into the interior of the arcuate flange 6. The entire hood as thus described is preferably made in one piece as a casting.

Upon the wall 11, on the right hand part thereof as viewed in Fig. 2, is a thin boss 16 upon which is pivotally mounted a guard element 17; and upon the left hand part of the wall 11 is a thick boss 18 upon which is pivoted a guard element 19. These two guard elements are generally of the same thickness, and the bosses 16 and 18 are faced off parallel to each other so that the two guard element 17 and 19 may lie thereon parallel to each other, and because of the different thicknesses of the bosses, 16 and 18, may overlap each other as shown in Figs. 1 and 2.

The pivot connections of these guard elements with the hood comprise respectively headed studs 21 and 22, projected through bores in the outer ends of the guard elements, and screwed into the bosses 16 and 18 against shoulders on the studs, to allow free pivoting movement of the guard elements. As shown in Fig. 1, the guard elements 17 and 19 depend from their pivots, arcuately, toward each other.

The guard elements may be rectangular in cross section but as indicated in Figs. 1 and 2 are ribbed for lightness and appearance, being generally of I-cross section.

The guard element 17 has therein a longitudinal slot 23, of predetermined shape for a purpose to be described, closed at its inner end as at 24, and at its outer end as at 25. The guard element 19 carries a pin 26 which extends through the slot 23, and in the operation to be described, slides therein. As shown in Fig. 2, the pin 26 has an enlarged portion 27 in a bore in the guard element 19, and a head 28 outwardly of the guard element 19, and after passing through the slot 23 goes through a washer 29 beyond which is a cotter 30 in the pin. This construction provides a pivoting and sliding connection between the inner overlapping ends of the guard elements.

The guard elements 17 and 19, depending from their pivot studs 21 and 22 and inwardly toward each other, are biased, as indicated in Fig. 1, by gravity, to pivotally move downwardly until the pin 26 engages the closed end 25 of the slot 23; but to further insure that they will be biased to move to and be stopped in that position, the guard element 19, above it pivot stud 22, has an arm 31 thereon, to the outer end of which is connected one end of a spring 32, the other end of which is connected to a stud 33 on the wall 11 of the hood.

The guard elements 17 and 19 are generally arcuate in form, and have downwardly convex marginal portions 52 and 53 and, in their said stopped normal positions, the marginal portions are preferably on a circle the radius of which is approximately the same as the periphery of the lower or working section of the saw teeth, which relationship is plainly shown in Fig. 1.

Upon the other wall 12 of the hood is also a pair of guard elements having pivot studs for pivotally mounting them on the hood wall, and they are preferably identical with the guard elements 17 and 19, so that in Fig. 1 they are directly behind the guard elements 17 and 19 and not visible; but they are identified in Fig. 2 as being the same as the guard elements 17 and 19, by the same reference characters with the suffix A, and so appear in Figs. 6, 7, and 8 to be discussed.

In Fig. 1, indicated in broken line at 34, is the top of a work table upon which work to be cut by the saw is placed; and at 35, 36, and 37 in broken line are indicated three work pieces of successively greater thickness to be cut by the saw, and the operation of the device under these different conditions is illustrated respectively in Figs. 3, 4, and 5.

It will be noted that some types of sawing machines to which my invention is applicable, are provided with means for raising and lowering the saw with respect to the work table, and Fig. 1 therefore in solid line, illustrates the position which the parts assume when the guard elements 17 and 19 hang from their pivot studs 21 and 22, uninfluenced by contact with the work table or work to be cut or being cut. In the position of the Fig. 1, the guard elements cover and guard the entire periphery of the working section of the saw below the hood guard 5, whereby in raising and lowering the saw even if it be rotating it is completely laterally guarded. The hood 5 itself covers and guards the upper part of the saw.

In Figs. 3 and 6 is illustrated the operation of the parts and the guarding function of the guard elements 17 and 19, when the saw is cutting a relatively thin piece of work 35 on the work table 34.

It will be assumed that the saw just cuts the top surface of the work table 34. The work 35 may be fed to the saw or the saw may be fed toward the work, depending upon the mode of operation of the sawing machine as a whole. In either case, there will be relative feed between the work piece and the saw; and for convenience we may refer to the work piece as being fed. (Fences, guides, etc. for guiding the work piece have been omitted for simplicity.)

When the work piece 35 is fed toward the saw, it first engages the guard element 17 (see Fig. 1) and then rocks it around its pivot stud 21 clockwise, and raises it and slides under it. This acts through the pin 26 and slot 23 and exerts force on the guard element 19 pivoting it counterclockwise around its pivot stud 22, the pin 26 sliding in the slot 23, whereby both guard elements 17 and 19 are raised; and the parts take up the positions shown in Fig. 3, the lower end portions of both guard elements resting and sliding upon the upper surface of the work piece 35.

Obviously, that section of the saw teeth, as at 39, which are making the cut, are embedded in the piece 35 and guarded thereby. The operator moving the piece 35 is at the right hand thereof as viewed in Fig. 3, feeding it in the direction of the arrow 51. The lower marginal portion 52 of the guard element 17, in Fig. 3, has moved inwardly exposing the saw teeth at 40 above the surface 38 of the work piece, and this, as viewed in the side view Fig. 3, would seem to expose the hand of the operator to hazard if he should move his hand toward the saw face as explained hereinbefore, but reference to Fig. 6 will show that this is not the fact. Fig. 6 is taken on the section line 6—6 of Fig. 3 whereat the radial extent of the saw below the guard element is maximum, namely, the radial extent between 41 and 42; but as shown in Fig. 6, the point 41 is laterally spaced from the point 42 so far and is so near to the work, that there is no possibility that the hand or even a finger of the operator moving laterally get under the point 41 and over toward the saw far enough to engage its teeth at 42, so that all of the teeth as at 40, Fig. 3, above the surface 38 of the work and exposed to lateral view, are in fact guarded by the element 17.

When as in Fig. 4, the work piece 36 is of intermediate thickness, its movement into the saw to be cut rocks the guard elements 17 and 19 into the position of that figure, and the work piece slides along under them, and now the exposed portion of the teeth 43 as viewed from the side as in Fig. 4 is at the maximum radial extent between the points 44 and 45; but in this case also, and as shown in Fig. 7, the point 44 is so far spaced laterally from the point 45 and so close to the work that the guard element 17 guards the saw.

In Fig. 5 is shown the position of the guard elements 17 and 19 when the work 37 being cut is of the maximum thickness. Most of the lower part of the saw is guarded by the work itself there being but a small number of teeth at 46 between the top surface of the work and the hood guard 5. The maximum distance or space between the guard element 17 and the teeth being that between the points 47 and 48, and as shown in Fig. 8 the point 47 being so far laterally of the point 48 of the saw and so close to the work as to prevent an accident by lateral movement of the user's hand on the work toward the saw.

On occasions in the use of the saw when a number of cuts are to be made on work pieces all of the same thickness, the user may take the trouble to rock the hood 5 to bring it closer to the upper surface of the work (utilizing the thumb screws 10—10 and the slots 9—9 described in connection with Fig. 2). For example for an intermediate thickness of work, he may rock the hood from the position of Fig. 4 to that of Fig. 9, and then as shown in Fig. 9, the laterally exposed portion of the saw teeth is between the points 49 and 50 and, to avoid the necessity of an additional figure, these points have been added to Fig. 7 where as shown the laterally open space between the work and the point 49 is almost entirely closed.

As will now be apparent, by giving to the marginal portions 52 and 53 of the guard elements 17 and 19 the arcuate shape described in connection with Fig. 1, any thickness of work approaching the saw and engaging the guard element 17 will rock it on its hinge stud 21 freely and without wedging therewith; and as the work passes through the saw both guard elements will, at their marginal portions, be tangential to the work as shown in going from Fig. 1 through Figs. 3, 4, and 5 and will slide thereon without wedging therewith.

In the above description of operation, the relative feed movement of the work and saw is indicated by the arrow 51, in the several figures, the work approaching the edge of the saw at which the cutting teeth move downwardly through the work; as in the case of cross cutting. In the case of rip cutting it is advisable for the work to approach the other edge of the saw and to feed relatively in the opposite direction, so that the element 19 is the one that will be first engaged by the work. By making the margin portions of the guard element 19 of the same curvature as that of the guard element 17, which is the preferred construction, the guard elements will in such cases both operate in the same manner, as that described above where the guard element 17 is the one which the work first engages.

By having the pin 26 on one guard element sliding in a slot 23 in the other guard element a number of advantages result. No matter which one of the guard elements is the one first engaged by the work and rocked thereby so as to slide upon the top of the work, it will rock the other guard element correspondingly. A single spring 32 biasing one guard element such as 19, biases both guard elements through the pin and slot connections therebetween. It is desirable for both guard elements 17 and 19 to be tangential at their lower marginal portions with the underlying work, and for all thicknesses of work, as shown in going from Figs. 1 to 5, this is accomplished by giving a suitable shape or contour to the slot 23, namely, that shape which the pin 26 on the element 19 would trace on the element 17 when the two elements take up progressively all desired positions in moving from that of Fig. 1 to that of Fig. 5.

While the foregoing description has been directed to the two guard elements 17 and 19, on one side of the saw and to their cooperation with the hood 5, this has been done for simplification, and it will be understood from what has heretofore been said that the same description applies to the guard elements 17A and 19A and the hood, on the other side of the saw.

It will be apparent from the foregoing that the guard elements 17 and 19 are so pivotally supported on the hood that they both are biased to move downwardly, by gravity, or both by the spring 32 when it is used; and that they are both stopped in their downward movement by the same means, the pin and slot connection 26—32. In cases in which the work is always to be fed in one direction for example in the direction of the arrow 51, Figs. 3, 4 and 5, the guard element 17 will function as a guard, alone; the spring 32 will then bias it downward acting through the element 19; and the pin 26 in the element 19 and in the slot 32 will act as the stop for the downward movement of the guard element 17. Similarly the guard element 19 may function alone as a guard, when the work is always to be fed in the other direction.

I claim:

1. A guard for a lower working tooth section of a circular saw, comprising a two-part guard element; the parts being pivotally supported at points laterally spaced at opposite sides of the saw rotational axis, and above the planes of relative feeding movement of the saw and work; and both parts depending from their pivot supports and extending inwardly under the saw axis; spring means engaging at least one of said parts to bias said guard pivotally downward away from the saw axis; and the parts having each a marginal portion opposite to and laterally spaced from a corresponding part of the saw tooth section and in the path of work fed to the saw; a pin and slot sliding and hinging connection connecting them together at their lower inner ends and limiting downward biased movement thereof; and causing the marginal portions of both to concurrently pivotally move upwardly by engagement of either of the parts with work fed to the saw in one direction or the other, and slidable on the fed work.

2. A guard for a lower working tooth section of a circular saw, comprising a two-part guard element; the parts being pivotally supported at points laterally spaced at opposite sides of the saw rotational axis, and above the planes of relative feeding movement of the saw and work; and both parts depending from their pivot supports and extending inwardly under the saw axis; spring means engaging at least one of said parts to bias said guard pivotally downward away from the saw axis; and the parts having each a downwardly convex curved marginal portion opposite to and laterally spaced from a corresponding part of the saw tooth section and in the path of work fed to the saw; a pin in one and a slot in the other providing a hinging and sliding connection connecting them together at their lower inner ends; the pin and slot connection limiting dowward biased movement the marginal portions being constrained to both concurrently pivotally move upwardly by the configuration of the slot upon engagement of either of the parts with work fed to the saw in one direction or the other, and slidable on the fed work.

3. Guard means for a circular saw comprising a hood covering and guarding the upper portion of the saw; a guard for a lower working tooth section of the saw comprising a two-part guard element; the two parts being pivotally supported on the hood at points laterally spaced at opposite sides of the saw rotational axis, and above the planes of relative feeding movement of the saw and work; and both parts depending from their pivot supports and extending inwardly under the saw axis in overlapping relation; spring means engaging at least one of said parts to bias said guard pivotally downward away from the saw axis; and stop means limiting downward biased movement; and the parts having each a marginal portion opposite to and laterally spaced from a corresponding part of the saw tooth section and in the path of work fed to the saw; a sliding and hinging connection connecting them together at their lower inner ends; the marginal portions being both constrained by the sliding and hinging connection, to concurrently pivotally move upwardly toward the saw axis and to increasingly overlap by engagement of either of the parts with work fed to the saw in one direction or the other, and slidable on the fed work.

JOHN EVERETTE TOMPKINS.

REFERENCES CITED

The following references are of record in the file of this patent:

UNITED STATES PATENTS

| Number | Name | Date |
|---|---|---|
| 261,090 | Grill | July 11, 1882 |
| 281,690 | Heinemann | July 24, 1883 |
| 1,099,588 | Coates | June 9, 1914 |
| 1,125,364 | Martin | Jan. 19, 1915 |
| 1,375,698 | Howe | Apr. 26, 1921 |
| 1,465,224 | Lantz | Aug. 14, 1923 |
| 1,481,569 | Tannewitz | Jan. 22, 1924 |
| 1,570,628 | Flohr | Jan. 26, 1926 |
| 1,623,290 | Wappat | Apr. 5, 1927 |
| 1,644,326 | Crowe | Oct. 4, 1927 |
| 1,690,817 | Hall | Nov. 6, 1928 |
| 1,830,151 | Wilderson | Nov. 3, 1931 |
| 1,888,679 | Knapp | Nov. 22, 1932 |

FOREIGN PATENTS

| Number | Country | Date |
|---|---|---|
| 153,002 | Austria | Apr. 11, 1938 |